United States Patent [19]
Bekki et al.

[11] Patent Number: 4,937,823
[45] Date of Patent: Jun. 26, 1990

[54] RING NETWORK CONFIGURATION

[75] Inventors: Yoshinori Bekki; Hiroyuki Wada; Masato Hirai, all of Hadano, Japan

[73] Assignee: Hitachi, Ltd., Chiyoda, Japan

[21] Appl. No.: 209,719

[22] Filed: Jun. 22, 1988

[30] Foreign Application Priority Data

Jun. 27, 1987 [JP] Japan .................................. 62-158813

[51] Int. Cl.$^5$ ............................................. G06F 11/20
[52] U.S. Cl. .................................... 371/11.2; 370/16.1
[58] Field of Search ........................ 371/8, 11, 8.1, 8.2, 371/11.1, 11.2; 370/15, 16, 86, 88, 16.1, 85.5, 85.12, 85.15; 340/825.01, 825.05

[56] References Cited

U.S. PATENT DOCUMENTS

| | | | |
|---|---|---|---|
| 4,320,508 | 3/1982 | Takezoe | 371/11 X |
| 4,709,365 | 11/1987 | Beale | 371/11 |
| 4,710,915 | 12/1987 | Kitahara | 370/88 X |
| 4,763,315 | 8/1988 | Nakayashiki | 370/16 |
| 4,777,330 | 10/1988 | Nakayashiki | 371/11 X |
| 4,815,069 | 3/1989 | Nakayashiki | 370/16 |

OTHER PUBLICATIONS

"Local Area Network According to Token Ring Access Method", Bit Magazine, vol. 16, No. 3, 1984, pp. 66-70.
IEEE 802.5R Draft G v0.6, "Draft Document on Reconfiguration Draft Version G", Sep. 8, 1986.
IEEE, "Token Ring Access Method and Physical Layer Specifications", 1985, pp. 27 and 37.

*Primary Examiner*—Jerry Smith
*Assistant Examiner*—Robert W. Beausoliel
*Attorney, Agent, or Firm*—Pennie & Edmonds

[57] ABSTRACT

In a ring network system including two transmission lines transmitting a signal in directions opposite to each other, and a plurality of line concentrators connected in the form of a loop by the two transmission lines and each accommodating a plurality of terminal stations connected to one of the two transmission lines, a signal detecting unit and a terminating circuit are disposed in each of the line concentrators on the signal output side of each of the transmission lines so as to be connectable to and disconnectable from the transmission lines, so that, when the signal detecting unit in one of the line concentrators is connected to the associated transmission line, the transmission line is disconnected in the line concentrator, and the terminating circuit is connected to the downstream segment of the disconnected transmission line.

2 Claims, 4 Drawing Sheets

5: SIGNAL DETECTING/TERMINATING MECHANISM
6, 7: MANAGING STATION

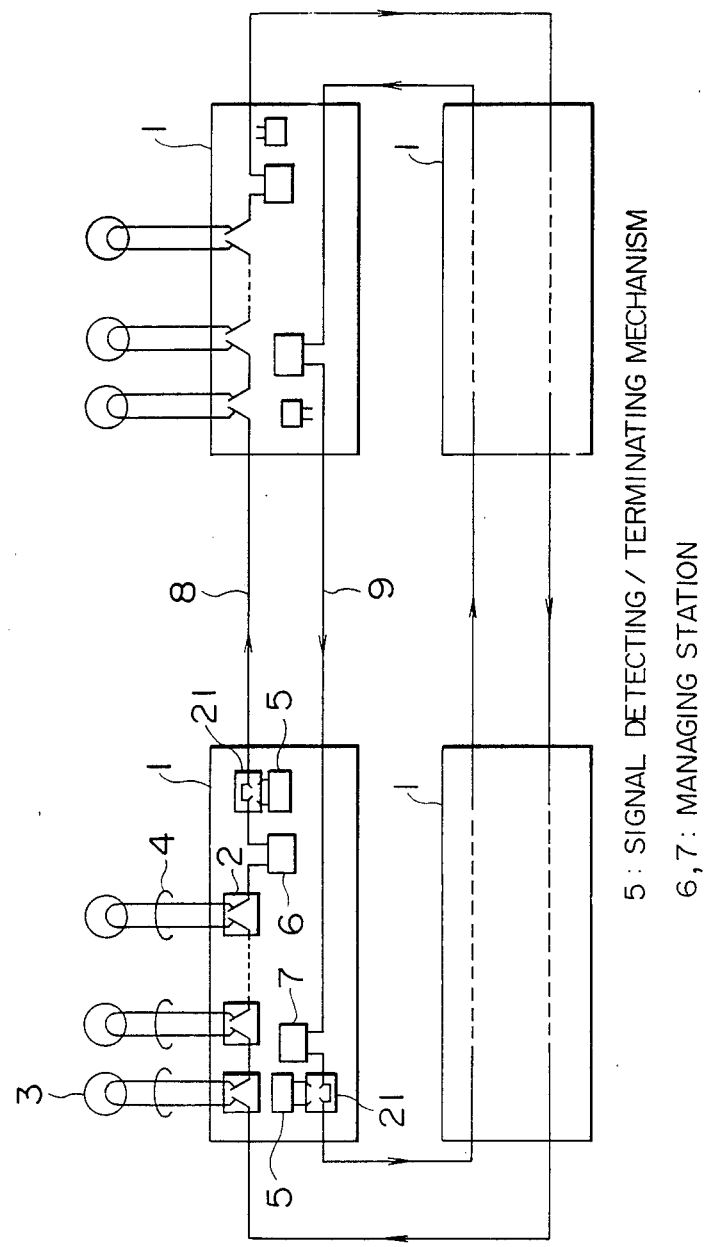

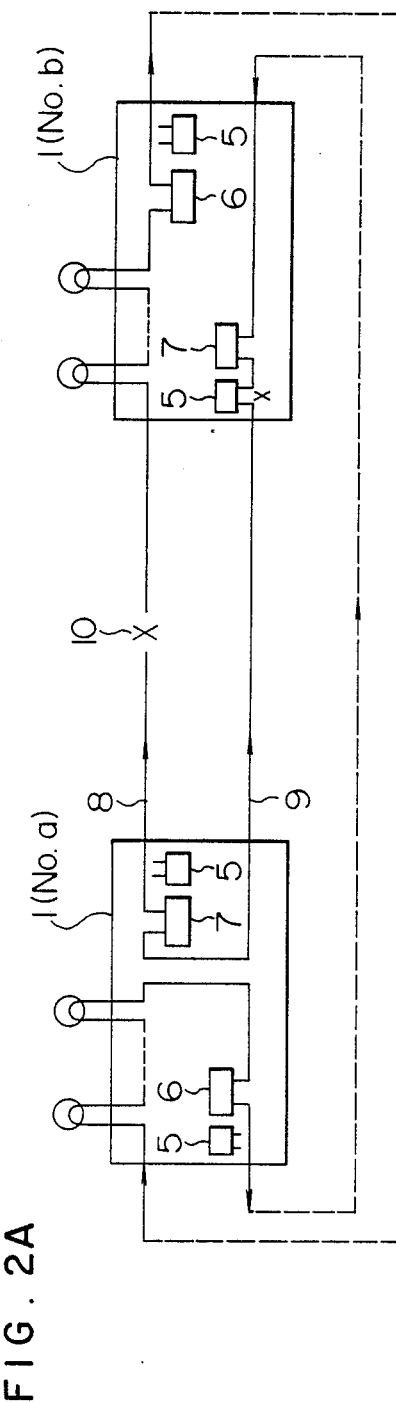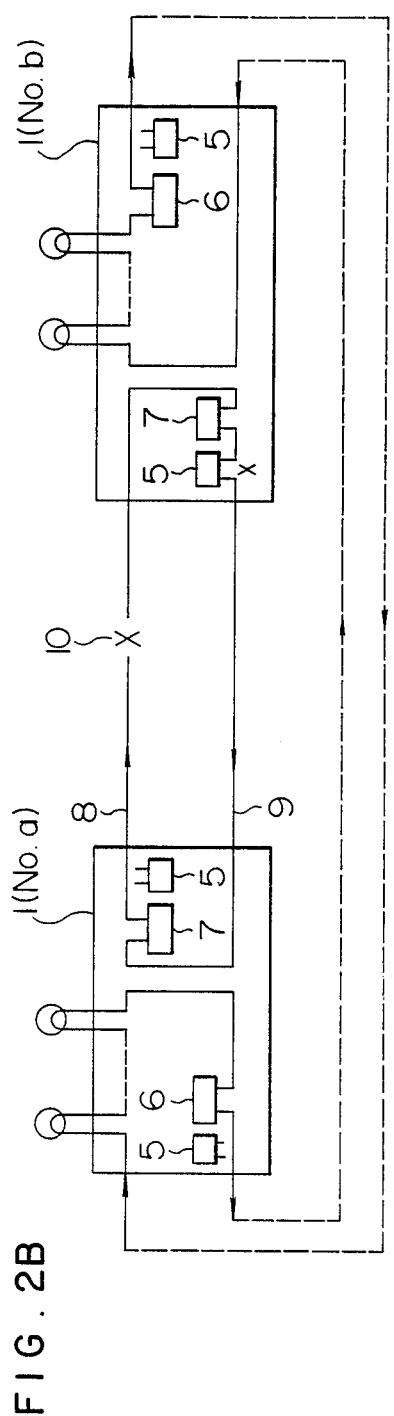
FIG. 2A
FIG. 2B

5: SIGNAL DETECTING/TERMINATING MECHANISM
6, 7: MANAGING STATION

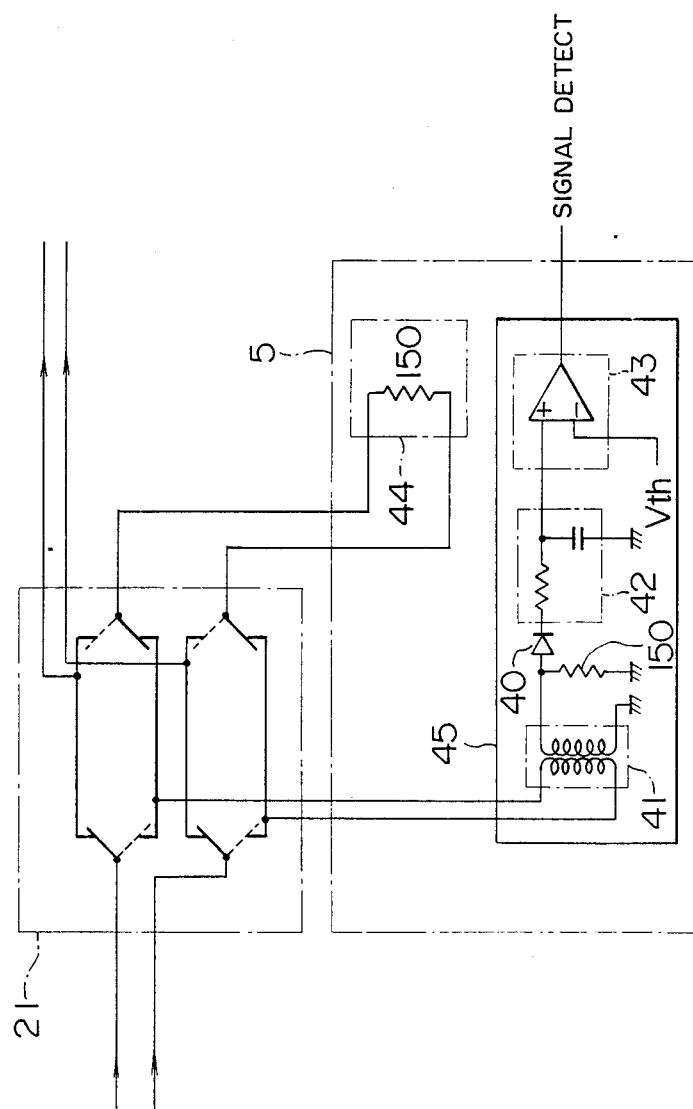

RING NETWORK CONFIGURATION

BACKGROUND OF THE INVENTION

This invention relates to a configuration of the transmission lines of a ring network, and more particularly to a ring network configuration in active wiring concetrators (or line concentrators) for improving the reliability of signal transmission over the transmission lines.

A method disclosed in, for example, 'Local Area Network According to Token Ring Access Method', Bit Magazine, Vol. 16, No. 3, 1984 is known as one of prior art methods relating to a transmission line configuration for accommodating a plurality of line concentrators in a ring network. The prior art method of this kind is such that, when a failure occurs on a ring segment connection between line concentrators (which are called active wiring concentrators (AWC) in the publication), the line concentrator located downstream of the defective ring segment connects a backup ring to a lobe extending toward the main ring, thereby interrupting the flow of a timing signal through the backup ring. The line concentrator located on the downstream side of the backup ring recognizes the disappearance of the backup ring segment and changes the connection of the main ring, thereby re-arranging the ring network. However, the state of the disconnected transmission line is not sufficiently considered in the prior art method described above. For example, when the transmission line is disconnected at a line concentrator located on the upstream side of the backup ring segment corresponding to the disconnected transmission line, sufficient consideration is not given to the problem of signal reflection and crosstalk, which have to be decreased, occurring in the line between the line concentrators located on the upstream and downstream sides of the backup ring.

As another prior art, a method disclosed in "IEEE 802.5R Draft G Vo. 6, Draft Document on Reconfiguration Draft Version G-8 Sept. 86" is known. According to this prior art method, a signal detector (referred to hereinafter as an SD) is inserted in a signal receiving ring of a ring pair so as to monitor a signal transmitted through the signal transmission line. However, the publication describes nothing as to connection and disconnection between the transmission line and the SD connected to the transmission line.

As discussed above, sufficient consideration is not given in the former prior art method as to the need of decreasing the signal reflection and crosstalk in the transmission line in the event of disconnection of the transmission line. Also, in the case of the latter prior art method in which the SD is kept connected to the transmission line under the normal operating condition of the ring network, a loss tends to occur in the signal being transmitted through the transmission line, resulting in a lowered reliability of signal transmission over the ring transmission line.

SUMMARY OF THE INVENTION

With a view to solve the prior art problems discussed above, it is an object of the present invention to provide a ring network configuration of line concentrators, which can decrease noise attributable to signal reflection, crosstalk, etc. in a ring transmission line and which can also decrease signal losses, thereby improving the reliability of signal transmission over the ring transmission lines.

According to one aspect of the present invention, the above object is attained by providing a terminating circuit having the same impedance as the characteristic impedance of the ring transmission line and a signal detecting unit, and controlling connection and disconnection between the transmission line and the signal detecting unit as well as the terminating circuit so that, when the transmission line is disconnected, the terminating circuit is connected to the downstream side of the disconnected transmission line, and the signal detecting unit is connected to the upstream side of the disconnected transmission line.

A relay is provided for controlling the connection and disconnection of the signal detecting unit and the terminating circuit to and from the transmission line. Under the normal operating condition, the relay acts to disconnect the signal detecting unit and the terminating circuit from the ring transmission line. That is, the relay acts to constitute the ring transmission line by bypassing at its contacts a signal flowing through the transmission line. On the other hand, when a failure occurs on the ring transmission line, the line concentrator controls the relay so that the ring transmission line is disconnected and changed over to remove the defective portion, and the signal detecting unit and the terminating circuit are connected to the upstream and downstream segments, respectively, of the disconnected transmission line.

Thus, the undesirable signal loss under the normal operating condition can be prevented, and the undesirable signal reflection and crosstalk in the transmission line disconnected due to occurrence of a failure can also be decreased, so that maloperation of the ring network can be prevented, and the reliability of signal transmission over the ring network can be improved.

BRIEF DESCRIPTION OF THE DRAWINGS

FIG. 1 is a general diagrammatic view of an embodiment of the present invention when applied to a ring communication system.

FIGS. 2A and 2B show the manner of looping back or ring back the ring segments when a failure occurs during the normal operation of the ring communication system.

FIG. 4 shows a structure of the signal detecting unit and the terminating circuit.

DESCRIPTION OF THE PREFERRED EMBODIMENTS

Figure 3:
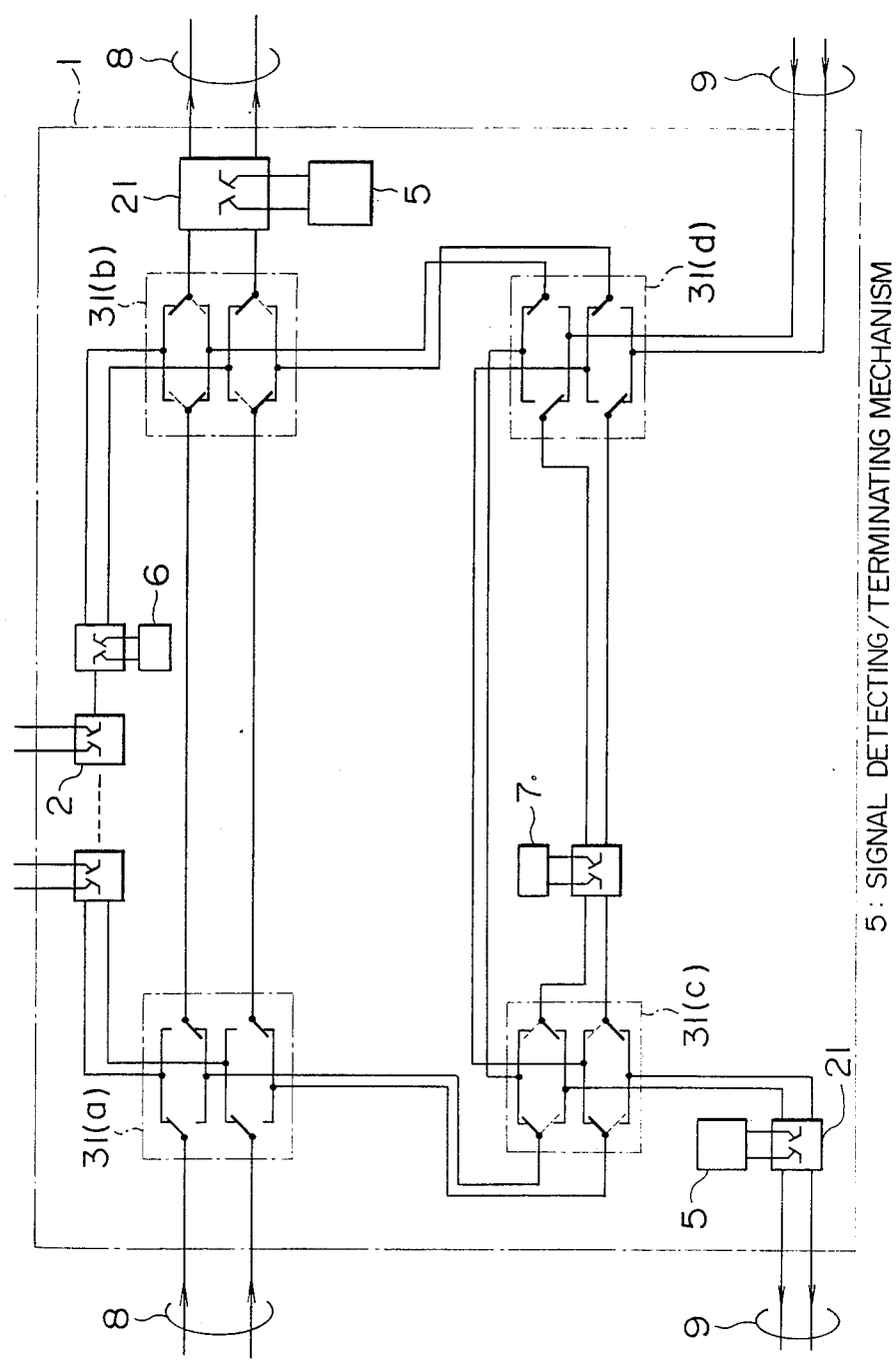
FIG. 3 shows a structure of the line concentrator.

An embodiment of the ring network configuration of line concentrators according to the present invention will now be described in detail with reference to FIGS. 1-4 of the drawings.

Referring to FIG. 1 showing an embodiment of the present invention when applied to a ring communication system, a plurality of line concentrators 1 are connected in the form of a loop by a main ring 8 and a standby ring 9 which transmit a signal in directions opposite to each other. Each line concentrator 1 includes two connection switched 21 which are used for connection and disconnection Of the main ring 8 and the standby ring 9 respectively and which are also used for connection and disconnection of associated signal detecting/terminating mechanisms 5 described in detail later; managing stations 6 and 7 which are connected to the main ring 8 and the standby ring 9, respectively, so as to control the configuration of the line concentrator 1; and a plurality of ring lobe connection switches 2 which connect a plurality of terminal stations 3 to the main ring 8 through a plurality of ring lobes 4 respectively.

When the ring communication system shown in FIG. 1 is in its normal operating condition, all the terminal stations 3 and the managing station 6 accommodated in each line concentrator 1 are connected in series with the main ring 8. On the other hand, the managing station 7 in each line concentrator 1 is connected to the standby ring 9. Under the normal operating condition of the ring communication system, the connection switches 21 in each line concentrator 1 act to merely connect between the upstream and downstream segments of each of the main and standby rings 8 and 9 respectively, and the signal detecting/ terminating mechanisms 5 in each line concentrator 1 are not connected to the main and standby rings 8 and 9. Therefore, communication between the terminal stations 3 is made through the main ring 8, and the standby ring 9 stands by to deal with a failure that may occur on the main ring 8.

Suppose that a failure occurs on the main ring 8 while the ring communication system is in its normal operating condition. How to re-arrange the ring network in such an event will now be described with reference to FIGS. 2A and 2B.

Suppose now that a ring breaking trouble occurs on the segment of the main ring 8 between the No. a line concentrator 1 and the No. b line concentrator 1 as shown in FIG. 2A. In such an event, a beacon MAC (medium access control) frame is sent out from the managing station 6 in the No. b line concentrator 1 to the downstream segment of the main ring 8. The beacon MAC frame is described in "Token Ring Access Method and Physical Layer Specifications, IEEE Std. 802.5-1985, pages 27 and 37". This beacon MAC frame passes finally through the main ring 8 in the No. a line concentrator 1 to arrive at the broken part 10 of the segment of the main ring 8, but cannot return to the managing station 6 of the No. b line concentrator 1. When the MAC frame sent out from the managing station 6 in the No. b line concentrator 1 and passed through the main ring 8 does not return to the managing station 6 in the No. b line concentrator 1 after a predetermined period of time has elapsed, the managing station 6 actuates the connection switch 21, which connects the signal detecting/terminating mechanism 5 to the standby ring 9, so as to disconnect the standby ring 9 in the No. b line concentrator 1, thereby informing the No. a line concentrator 1 of the ring change-over. Such a procedure is known and described in "IEEE 802.5R Draft G Vo. 6" cited already. The managing station 7 in the No. a line concentrator 1 detects disappearance of data streaming through the standby ring 9. That is, the managing station 7 detects disappearance of a predetermined signal circulated through the standby ring 9 between the managing stations 7, and the main ring 8 in the No. a line concentrator 1 is looped back or ringed back to the standby ring 9 as shown in FIG. 2A.

As a result, the MAC frame being continuously sent out from the No. b line concentrator 1 is turned back from the No. a line concentrator 1 to return to the standby ring 9 in the No. b line concentrator 1 and is received by the managing station 7 in the No. b line concentrator 1. The managing station 7 in the No. b line concentrator 1 detects that ring looping-back has been made in another line concentrator 1 on the standby ring 9 and acts to loop back the standby ring 9 in the No. b line concentrator 1 to the main ring 8. As a result of the above procedure, the connection arrangement between the No. a and No. b line concentrators 1 is now as shown in FIG. 2B. Thus, the communication ring network is re-arranged in which the defective ring portion is removed, and the operation can be continued through the illustrated ring communication system.

Additionally, the MAC frame referred to in the above will be further described. As far as the present situation in the field of the ring networks is concerned, the MAC frame is classified into types 1, 2, 3 and 4 according to the priority order. The type-1 MAC frame has the highest priority, and the type-4 MAC frame has the lowest priority. For example, these MAC frames are used in a manner as described below. When a failure which has occurred on the transmission line is detected by one of the terminal stations, this terminal station sends out the MAC frame of lowest or lower priority such as the type-2, type-3 or type-4 MAC frame to the downstream segment of the main ring 8 in the associated line concentrator 1. When this MAC frame is detected by a line concentrator, the managing station of the line concentrator changes the detected MAC frame to the type-1 MAC frame having the highest priority and sends the same to the downstream side thereof. On the other hand, when such failure is directly detected by the managing station of a line concentrator having no terminal stations connected to the ring, this specific managing station sends out the type-1 MAC frame of highest priority to the downstream segment of the main ring 8 in the line concentrator.

In the above-mentioned operation, on the occasions such as when the managing station 6 in the No. b line concentrator 1 the signal detecting/ terminating mechanism 5 is connected to the disconnected portion of the standby ring 9 according to the ring network configuration of the present invention. The signal detecting part of the signal detecting/terminating mechanism 5 is used, for example, to detect that a signal starts to be transmitted through the ring again after recovery of a failure.

FIG. 3 shows the detailed structure and wiring of ring change-over switches 31 provided in each line concentrator 1 so as to carry out change-over between the main ring 8 and the standby ring 9 and to form a loop connection between these rings 8 and 9.

Referring to FIG. 3, the ring change-over switches 31a to 31d change over between the main ring 8 and the standby ring 9 in each line concentrator 1 by suitably connecting between the upstream and downstream segments of the main and standby rings 8 and 9. For example, when a looping or ring-back connection as shown in FIG. 2A is to be formed in the No. a line concentrator 1, the ring change-over switches 31a tto 31d are controlled so that the ring change-over switches 31a and 31d are placed in their solid-line position in FIG. 3, while the ring change-over switches 31b and 31c are placed in their dotted-line position opposite to that of the switches 31a and 31d. Also, when a ring-back connection as shown in FIG. 2B is to be established in the No. b line concentrators 1, the ring change-over switches 31a and 31d are placed in their dotted-line position in FIG. 3, while the ring change-over switches 31b and 31c are placed in their solid-line position.

FIG. 4 shows the structure of the signal detecting-/terminating mechanism 5 connected to the main ring 8 or standby ring 9 when the ring is disconnected and shows also the structure of the connection switch 21 connecting the signal detecting/terminating mechanism 5 to the main ring 8 or standby ring 9.

Referring to FIG. 4, the signal detecting and terminating mechanism 5 which is composed of a terminating circuit 44 and a signal detecting unit 45 is shown connected by the connection switch 21 to the downstream segments of the main ring 8 and standby ring 9 in the line concentrator 1. The terminating circuit 44 includes a resistor having a resistance value of, for example, 150 Ω which is equal to the characteristic impedance of the ring 8 or 9. The signal detecting unit 45 includes a pulse transformer 41 isolating the signal detecting unit 45 from the ring 8 or 9 in a d.c. sense and permitting transmission of an a.c. signal only, a resistor having a resistance value of 150 Ω, a diode 40, a smoothing circuit 42 and a level detecting circuit 43. Normally, the connection switch 21 has its contacts placed in the solid-line position shown in FIG. 4 and acts to merely connect the segments of the ring 8 or 9 which is the path of signal transmission. However, when a failure or the like occurs on the main ring 8, and the standby ring 9 is to be disconnected for looping or ring-back purpose as described with reference to FIGS. 2A and 2B, the contacts of the connection switch 21 are changed over to their dotted-line position shown in FIG. 4. As a result, the downstream segment of the ring is separated from the upstream segment of the ring at the position of the connection switch 21, and the terminating circuit 44 and the signal detecting unit 45 are connected to the downstream-side and upstream-side terminals respectively of the disconnected ring. The function of this signal detecting unit 45 is to detect the state of the signal for monitoring whether or not the source of failure has been recovered as a result of control of the internal configuration of the line concentrator 1. Therefore, when the pulse transformer 41 of the signal detecting unit 45 receives an a.c. signal transmitted from the upstream segment of the main ring 8 or standby ring 9, the a.c. signal is rectified and smoothed by the combination of the diode 40 and the smoothing circuit 42 into a d.c. signal, and the level of the d.c. signal is compared in the level detecting circuit 43 with a threshold level to detect whether or not the level of the a.c. signal is higher than a predetermined setting. Therefore, this signal detecting unit 45 need not be operated when the ring network is in its normal operating condition and is normally disconnected by the connection switch 21 from the main ring 8 or a standby ring 9. This signal detecting unit 45 may be disposed at a position separated from the terminating circuit 44. However, in order to decrease the number of relays, the signal detecting unit 45 and the terminal circuit 44 are connected to and disconnected from the ring under control of a common relay. It is apparent that the structure of the signal detecting unit 45 is in no way limited to the illustrated one and may be any one of various other suitable structures.

The ring change-over switches 31a and 31d and ring connection switches 21 used in the afore-mentioned embodiment of the present invention are constituted by contacts of relays (not shown) controlled by the managing station 6 or 7. The ring change-over switches 31a to 31d are used to form a looping or ring-back connection between the main ring 8 and the standby ring 9 in each line concentrator 1. However, these switches 31a and 31d may form a single loop in each line concentrator 1 to be used for communication between the terminal station 3 accommodated in the same concentrator 1. In this case, the signal detecting unit 45 in each line concentrator 1 may be connected to the segment of the ring extending to the next adjacent line concentrator 1 to be used for monitoring the operating condition of the next adjacent line concentrator 1.

It will be understood from the foregoing detailed description of the present invention that, when the transmission line is disconnected due to occurrence of a failure, the terminating circuit is connected to one of the disconnected ends of the transmission line, thereby preventing generation of noise or crosstalk attributable to, for example, signal reflection from the disconnected end. Also, because the signal detecting unit required for re-arrangement of the ring network in the event of occurrence of a failure is not normally connected to the transmission line during normal operation, mal-detection of disconnection of the transmission line due to noise and the like can be prevented. Further, an undesirable signal loss can be minimized during normal operation of the ring network configuration of line concentrators of the present invention. Thus, in the ring network configuration of line concentrators according to the present invention, mal-detection of the signal required for the purpose of rearranging the transmission lines can be prevented to improve the reliability of the ring network.

I claim:

1. A line concentrator for use in a ring network system including two transmission lines transmitting a signal in directions opposite to each other, and a plurality of the line concentrators connected in the form of a loop by said two transmission lines and each accommodating a plurality of terminal stations connected to one of said two transmission lines, said line concentrator comprising:
   signal detecting means disposed on a signal output side of each of said transmission lines for detecting signals sent over the connected transmission line;
   terminating means disposed on the signal output side of each of said transmission lines for terminating the connected transmission line; and
   control means for disconnecting one of said transmission lines from the line concentrator while at the same time both connecting said signal detecting means associated to the disconnected transmission line and connecting said terminating means associated to a downstream segment of the disconnected transmission line.

2. A ring network system comprising:
   two transmission lines transmitting a signal in directions opposite to each other; and
   a plurality of the line concentrators connected in the form of a loop by said two transmission lines and each accommodating a plurality of terminal stations connected to one of said two transmission lines,
   said line concentrator including:
   signal detecting means disposed on a signal output side of each of said transmission lines for detecting signals sent over the connected transmission line;
   terminating means disposed on the signal output side of each of said transmission lines for terminating the connected transmission line; and
   control means for disconnecting one of said transmission lines from the line concentrator while at the same time both connecting said signal detecting means associated to the disconnected transmission line and connecting said terminating means associated to a downstream segment of the disconnected transmission line.

* * * * *